United States Patent
McDowell

[15] 3,648,509
[45] Mar. 14, 1972

[54] FORMED GAS METER CONDUIT

[72] Inventor: William B. McDowell, Fenton, Mich.

[73] Assignee: Michigan Tube Benders, Inc., Ypsilanti, Mich.

[22] Filed: Sept. 19, 1969

[21] Appl. No.: 859,509

[52] U.S. Cl. ................................ 72/369, 29/157, 72/318, 72/367
[51] Int. Cl. ........................................................ B21d 9/00
[58] Field of Search .............. 29/157; 72/367, 368, 369, 318, 72/354

[56] References Cited

UNITED STATES PATENTS

| | | | |
|---|---|---|---|
| 3,000,424 | 9/1961 | Weise | 29/157 |
| 2,155,079 | 4/1939 | Cornell | 29/157 |
| 1,152,858 | 9/1915 | Stewart | 72/367 |
| 3,209,453 | 10/1965 | Bertoglio et al. | 72/354 |

Primary Examiner—John F. Campbell
Assistant Examiner—Donald C. Reiley, III
Attorney—Beaman & Beaman

[57] ABSTRACT

The disclosure relates to a formed conduit for supporting natural gas meters having fittings defined thereon, and the method of making the same. The conduit, while in a linear tubular configuration, is formed at one end by a forging or swaging operation wherein an outwardly extending radial flange is defined thereon of the material of the conduit, and other desired configurations may be formed on the forged end, such as gasket receiving and sealing surfaces and the like. After forging the conduit is bent to a final configuration wherein the shaped end is usually bent back toward the central region of the conduit wherein the axis of the shaped end is disposed parallel to and spaced from the axis of the conduit central region, which is ultimately mounted on a supporting bracket.

3 Claims, 9 Drawing Figures

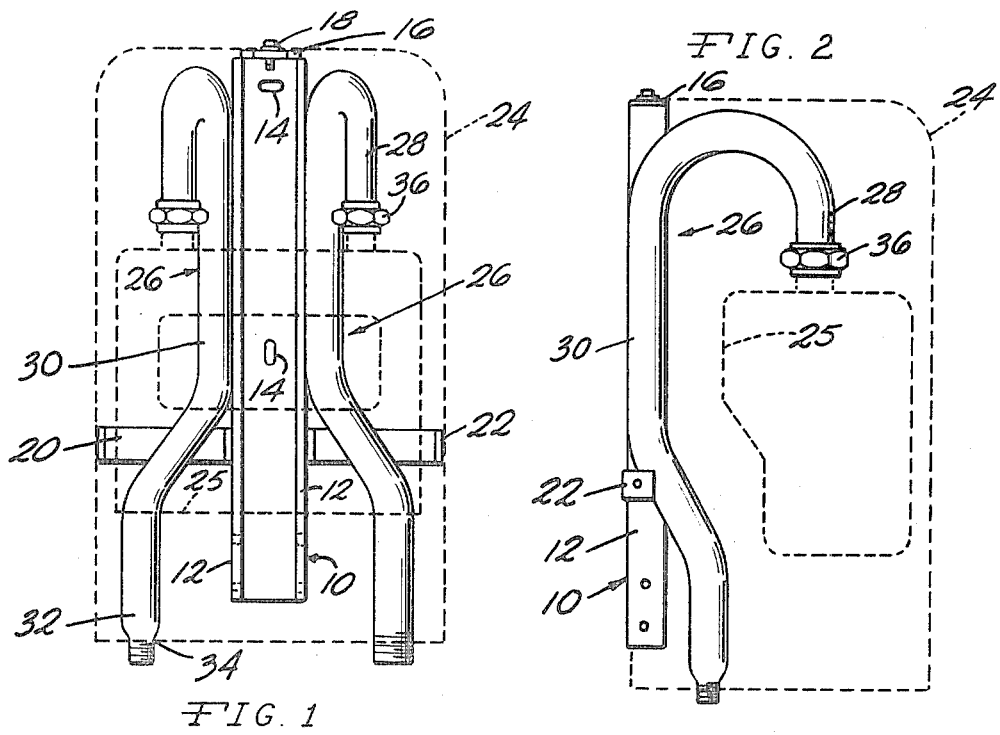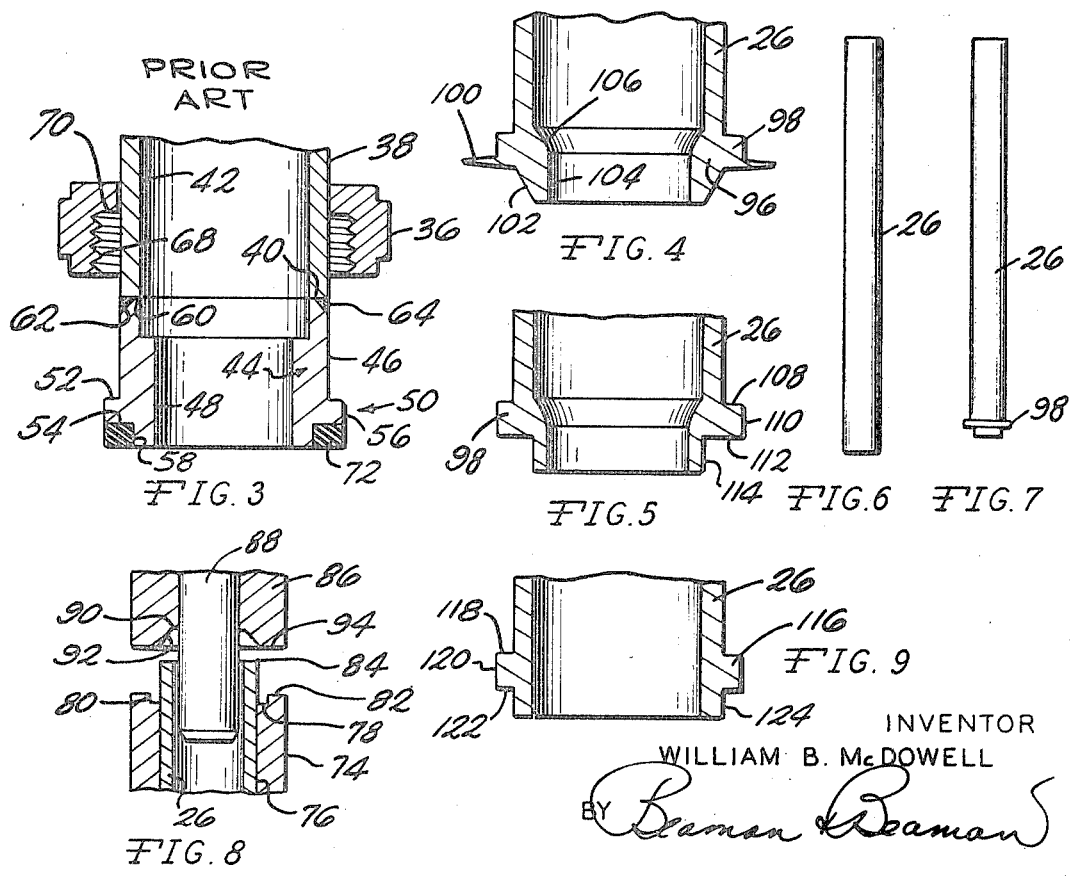

FORMED GAS METER CONDUIT

BACKGROUND OF THE INVENTION

The invention pertains to the formation of conduits for natural gas meters wherein union fittings, and the like are homogeneously formed on the conduit end.

Public utility service meters, particularly natural gas meters, are usually mounted upon supporting brackets affixed to the exterior wall of the building being serviced, when such meters are used with domestic dwellings. A variety of supporting brackets are available to public utilities and these brackets often include conduits associated therewith for attachment to the gas meter, and communicating with the supply and service line. Examples of this type of gas meter bracket, and conduits associated therewith are shown in the applicant's U.S. Pat. Re. 26,191 and application Ser. No. 682,876 filed Nov. 14, 1967, now U.S. Pat. No. 3,506,229.

In the manufacture of gas meter conduits as shown in the above identified patent and application, and as manufactured by other suppliers, the union type fitting required at the upper end of the conduit for attachment to the union connection at the gas meter has previously been separately formed with respect to the shaped conduit and welded thereto. Thus, in the formation of the completed conduit it is necessary to form the union connection by a separate machining process, such as on a lathe or screw machine, prepare the end of the conduit, align the fitting to the conduit end and weld the fitting to the conduit, thereupon, the weld is ground flush with the configuration of the conduit and the conduit is then bent to the desired configuration. Prior to affixing the conduit to its supporting bracket a union nut is placed upon the conduit and the nut is adapted to engage a radially extending flange defined upon the union fitting welded to the conduit end.

The aforedescribed procedure necessitates several expensive fabricating and secondary operations, and if aluminum conduits are used, special welding techniques must be employed which further add to the cost of manufacture. Also, in view of the welding procedure the possibility of gas leaks existing at the weld is present and the possibility of weaknesses existing in the conduit adjacent the union fitting exist, particularly adjacent the weld area wherein the conduit has been heated to high temperatures and then cooled, and crystallization and the formation of stress points have been created.

SUMMARY OF THE INVENTION

It is a basic object of the invention to improve the manufacture of gas meter mounting conduits having a union type fitting at one end thereof by forming the fitting from the material of the conduit itself by a forging or swaging operation wherein the fitting is homogeneous and integral with the conduit and the formation of the fitting does not create weaknesses in the conduit. In fact, the manufacture of a gas conduit in accord with the invention provides a fitting of considerably higher strength and improved physical characteristics over a welded fitting, and improves the physical characteristics of the entire assembly, particularly adjacent the union connection.

In the manufacture of a gas conduit in accord with the invention a linear tubular conduit, either formed of steel or aluminum, is placed in a two-part die, and securely clamped therein to restrain the conduit against axial movement. The movable portion of the die is then axially moved toward the second die portion to cause the conduit material at its end within the die to flow both axially and radially to form a radially extending flange outwardly disposed with respect to the conduit configuration. In some embodiments of the invention it is also desired that the metal flow inwardly to produce gasket sealing and supporting surfaces and a passage of lesser diameter than the passage within the unformed portion of the conduit.

In that the fitting of the conduit is homogeneously defined from the material of the conduit itself, the flow of material during the formation of the fitting portion is such as to strengthen and work harden the conduit adjacent the fitting and provide an assembly of greater physical strength than the previously described welded assembly. After the formation of the fitting in the die it is usually of advantage to remove any flashing that has occurred during the formation, and perform light machining operations upon the formed conduit to define sharper and more accurate surfaces than are usually produced in this type of forging or swaging operation.

After the union fitting is formed upon the conduit the conduit is bent to the desired configuration, which usually involves bending the end of the conduit adjacent the fitting end approximately 180° with respect to the central region of the conduit wherein the axis of the fitting end is disposed generally parallel to and spaced from the conduit central region. A union nut is placed upon the conduit, and the conduit is either welded to or clamped to a conduit supporting bracket which is ultimately fixed upon the dwelling with which the gas meter is to be associated. The lower end of the conduit is normally threaded for connection to the supply and service lines, or gas pressure regulator fitting.

A further object of the invention is to provide a homogeneous gas meter conduit and union nut assembly which is of reduced manufacturing cost as compared with previous manufacturing techniques, is of improved physical characteristics, safe in use and assembly, and of high strength.

BRIEF DESCRIPTION OF THE DRAWING

The aforementioned objects and advantages of the invention will be appreciated from the following description and accompanying drawings wherein:

FIG. 1 is a front elevational view of a gas meter mounting bracket utilizing conduits formed in accord with the invention, FIG. 2 is a side elevational view of the assembly of FIG. 1, as taken from the left thereof, FIG. 3 is an enlarged, detail, diametrical, cross sectional view of the prior art type of assembly of the union fitting to the gas conduit, FIG. 4 is an enlarged, diametrical, detail cross sectional view of the fitting end of a gas conduit formed in accord with the invention upon being removed from the forming die, and prior to being machined, FIG. 5 is a view similar to FIG. 4, illustrating a configuration of the conduit fitting end after machining, FIG. 6 is an elevational view of a gas meter conduit in accord with the invention prior to forming the union fitting and bending, FIG. 7 is an elevational view of the gas meter conduit subsequent to the formation of the union fitting and machining, and prior to bending, FIG. 8 is an elevational, diametrical, detail view of a die in which the embodiment of FIGS. 4 and 5 may be formed illustrating the die in the open condition and the conduit end position prior to forging, and FIG. 9 is an enlarged, diametrical, sectional, elevational view of another configuration of conduit end fitting in accord with the invention.

DESCRIPTION OF THE PREFERRED EMBODIMENTS

FIGS. 1 and 2 illustrate a typical gas meter bracket assembly with which the conduit of the invention is utilized, the assembly shown in FIGS. 1 and 2 is similar to that shown in my copending application Ser. No. 682,876 filed Nov. 14, 1967, now U.S. Pat. No. 3,506,229. For purposes of understanding the environment in which the invention is used, the assembled meter mounting bracket will be described.

A U-shaped channel 10 having lateral leg portions 12 is adapted to be mounted upon the wall of the supporting dwelling by means of holes 14 defined in the base portion of the channel member through which bolts, not shown, extend. The upper end of the channel 10 includes a plate portion 16 having a hole defined therein for receiving a bolt 18, and a transversely disposed metal strap 20 is affixed to the channel having end plates 22 in which holes are defined for receiving screws, not shown, wherein the end plates 22 and the plate 16 are used to locate and support a gas meter housing 24, outlined in dotted lines, adapted to encompass the bracket and the gas meter 25, also shown in dotted lines.

In the disclosed embodiment the conduits 26 are welded to the channel 10 and include a union end 28, a central region 30 and lower ends 32 which are threaded for connection to the supply and dwelling service lines. The left conduit of FIG. 1 is swaged at 34, and the resulting lesser diameter is threaded for connection to the regulator or regulator fitting. The right conduit of FIG. 1 may also be swaged, or may be of the same diameter as the conduit, as in the disclosed embodiment.

The union fitting end 28 of the conduit includes nuts 36 capable of being threaded to the threaded union connections defined upon the upper portion of the gas meter, and in this manner the conduits 26 serve as the support for the gas meter, and it will be appreciated that as the conduits serve to support the gas meter the conduits will be under stresses imposed thereon by the weight of the meter, or due to any misalignment that may have occurred during assembly and installation of the apparatus.

The previous manufacture of gas conduits, with respect to the union fitting, is shown in FIG. 3. In this figure the gas conduit 38 includes an end 40 having an internal bore as indicated at 42. The union fitting, generally indicated at 44, is separately formed on a lathe or screw machine and includes an outer cylindrical surface 46 of a diameter corresponding to that of the conduit, an inner diameter 48 of lesser diameter than the conduit bore, a flange 50 defined by radially extending surfaces 52 and 54, and an outer cylindrical surface 56, and a cylindrical axially extending surface 58 intersecting the flange surface 54.

The fitting 44 is provided with an end 60 which is chamfered at 62 to provide a weld-receiving recess as will be apparent from FIG. 3. In attaching the fitting to the conduit 38 the fitting and conduit must be accurately aligned and held together, and welded while so oriented. If the conduit and fitting are formed of aluminum, heliarc or other special welding techniques must be employed to produce an acceptable weld. After welding, the weld 64 is ground to a diameter corresponding to that of the conduit and fitting outer diameter such that the fact that the fitting 44 and the conduit 38 are actually separate pieces does not become apparent to the eye.

The union fitting is completed by slipping a nut 36 over the conduit 38, and the nut includes internal threads 68 and a radially disposed surface 70 adapted to engage the flange surface 52 when the nut engages the threads of the union fitting defined upon the meter. A rubber basket 72, of annular configuration, is located upon the union fitting surfaces 54 and 58 as apparent in FIG. 3.

In accord with the invention, the "two-piece" assembly described above is eliminated by directly forming the union configuration of the conduit from the conduit material. This operation can be accomplished in a two-part die such as shown in FIG. 8. One portion of the die, such as the portion 74, is fixed, and includes a bore 76 closely receiving the conduit 26. Clamping means, not shown, are provided for preventing axial movement of the conduit within the die during the formation of the union fitting end. The die 74 includes a radial surface 78 and an axially extending surface 80 intersecting the die parting line surface 82. It will be appreciated that end 84 of the conduit extends above the die surface 82 toward the movable portion of the die generally indicated at 86.

The movable die portion includes a mandrel 88 which extends into the bore of the conduit. If the fitting embodiment of FIGS. 4 and 5 is to be formed, the mandrel 88 will be of a lesser diameter than the normal diameter of the conduit bore. If the embodiment of FIG. 9 is to be formed, the diameter of the mandrel will be substantially equal to that of the conduit. The die 86 includes a cavity formed by the radial surface 90 and the obliquely disposed surface 92 intersecting the parting line surface 94.

Formation of the union fitting is produced by rapidly bringing the dies 74 and 86 together wherein the parting surfaces 82 and 94 substantially engage. The dies are then separated and the conduit is removed from the die portions. The resulting configuration will be apparent from FIG. 4 wherein it will be appreciated that the end of the conduit has been thickened at 96 to produce a wall thickness greater than that of a normal conduit wall thickness defining the flange 98 and its radial surfaces. A flashing 100 will usually exist due to the flow of metal between the die parting line surfaces. The oblique surface 102 is formed by the die surface 92, and the presence of a mandrel 88, which is of a lesser diameter than the conduit bore, as shown in the die embodiment of FIG. 8, forms a reduced passage 104, while the shoulder 106 will be formed due to the flow of metal inwardly.

The formed conduit as shown in FIG. 4 is then placed in a lathe or similar machine, and by means of a forming tool, or the like, is quickly and easily machined to the configuration of FIG. 5. The flashing 100 is removed, and the surfaces 108, 110, 112 and 114 are readily defined in an accurate manner upon the conduit formed end. The surfaces 108, 110, 112 and 114 correspond to the union surfaces 52, 56, 54 and 58, respectively, of the fitting construction shown in FIG. 3. The conduit 26 is now of the configuration of FIG. 7, and may be bent to the form shown in FIGS. 1 and 2. If threads are to be defined on the opposite end of the conduit to which the union fitting is formed, or if that end of the conduit is to be swaged to a smaller diameter, this operation is performed prior to the bending.

FIG. 9 illustrates a slight variation in a forged union configuration wherein the bore of the conduit remains the same through the union fitting. In the formation of the embodiment of FIG. 9, the mandrel 88 is of the same diameter as the conduit 26 wherein no inward flow of conduit material during forming is permitted. The flange 116 is formed in the die, and during the machining operation the flange surfaces 118, 120 and 122 are defined as well as the axially extending surface 124 for receiving a gasket.

It will be appreciated that due to the flowing of the conduit material during the formation of the union fitting that the grain of the material will extend generally parallel to the length of the conduit and the axis of the fitting wherein superior physical characteristics are achieved, and the absence of a weld connection produces relatively uniform physical characteristics adjacent the union fitting without creating areas subject to crystallization and severe stress points.

When the conduit is formed of aluminum it may be an alloy of the 6061 T No. 6 type or the 6063 T No. 4 type may be used. When using aluminum the formation of the union fitting in the forging or swaging dies may be accomplished without the application of external heat. If the conduit is to be formed of steel, a pipe of the alloy A 53, may be employed, and usually, external heat will be applied to the conduit end prior to forming. The size of pipe formed in accord with the invention usually is of the three-quarter inch to 1½ inches internal diameter sizes. Of course, sizes larger or smaller than this may be employed in the practice of the invention.

I claim:

1. The method for forming a shaped gas meter conduit from a metallic, linear, tubular conduit having first and second ends, a bore, a substantially uniform wall thickness and a central region wherein the shaped conduit is formed with a homogeneous flanged union connection at one of said ends adapted to receive a nut comprising the steps of placing one end of the linear conduit in a forming die, restraining said conduit from axial displacement, forming said conduit one end by the application of force in the axial direction to cause the metallic material of said one end to flow radially outward defining an annular flange homogeneous with said conduit and extending outwardly beyond the normal configuration of the conduit, machining said flange and one end to define a radial annular surface on said flange and a cylindrical surface intermediate said surface and said one end intersecting said surface defining an annular seal receiving recess, and bending said flanged and machined conduit to the desired final shape.

2. The method of forming a shaped gas meter conduit as in claim 1 wherein the portion of said conduit adjacent said one end is bent back approximately 180° toward the conduit central region wherein the axis of the flanged one end is approximately parallel to the conduit central region.

3. The method of forming a shaped gas meter conduit as in claim 1 wherein the conduit material adjacent said one end is formed inwardly by the material flow defining a bore of a diameter less than the bore of the conduit simultaneously with the formation of said flange.

* * * * *